(12) United States Patent
Cooper et al.

(10) Patent No.: US 6,992,992 B1
(45) Date of Patent: Jan. 31, 2006

(54) DOWNLINK BEAM HOPPING WAVEFORM

(75) Inventors: Scott A. Cooper, Torrance, CA (US); Reginald Jue, Manhattan Beach, CA (US); Esmaell Yousefi, Manhattan Beach, CA (US); David A. Wright, Hermosa beach, CA (US); Stuart T. Linsky, San Pedro, CA (US); Mark E. Bever, Redondo beach, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 1090 days.

(21) Appl. No.: 09/599,040

(22) Filed: Jun. 21, 2000

(51) Int. Cl.
 *H04B 7/212* (2006.01)

(52) U.S. Cl. ............... 370/324; 370/321; 370/316; 455/12.1

(58) Field of Classification Search ........ 370/315–325, 370/389, 392, 393; 455/427, 428, 12
See application file for complete search history.

(56) References Cited

U.S. PATENT DOCUMENTS

| | | | |
|---|---|---|---|
| 5,689,502 A | 11/1997 | Scott | |
| 5,696,762 A * | 12/1997 | Natali et al. | 370/320 |
| 5,966,416 A | 10/1999 | Hendrickson | |
| 5,982,761 A * | 11/1999 | Dutta | 370/337 |
| 6,430,394 B1 * | 8/2002 | Boyden | 455/13.4 |
| 6,512,749 B1 * | 1/2003 | Wright et al. | 370/316 |
| 6,516,438 B1 * | 2/2003 | Wilcoxson et al. | 714/755 |
| 2004/0114547 A1 * | 6/2004 | Christodoulides et al. | 370/316 |

FOREIGN PATENT DOCUMENTS

| | | |
|---|---|---|
| EP | 0994579 | 4/2000 |
| GB | 2336508 | 10/1999 |

* cited by examiner

*Primary Examiner*—Frank Duong
*Assistant Examiner*—Michael J. Moore
(74) *Attorney, Agent, or Firm*—Tarolli, Sundheim, Covell & Tummino L.L.P.

(57) ABSTRACT

A frame signal (100) for communicating payloads (104, 110) of data includes a first payload field (104) and a first header field (102) with a first frame type indicator (120). The frame signal (100) also includes a second payload field (110) and a second header field (108) smaller than the first header field (102) that includes a second frame type indicator (128). The first payload field (104), first header field (102), second payload field (110), and the second header field (108) are encapsulated in a single frame (100) to provide multiple payload delivery with reduced overhead compared to individually transmitted single payload frames.

12 Claims, 8 Drawing Sheets

DOWNLINK BEAM HOPPING WAVEFORM

CROSS-REFERENCE TO RELATED APPLICATIONS

This application is related to TRW Docket No. 22-0067, titled "Downlink Transmission and Reception Techniques for a Processing Communication Satellite" filed Sep. 29, 1999 as application No. 09/408,041, by inventors David A. Wright et al., and since issued as U.S. Pat No. 6,512,749 B1.

BACKGROUND OF THE INVENTION

The present invention relates to satellite communication system downlink waveform structures. In particular, the present invention relates to an efficient satellite downlink waveform including multiple payloads per downlink frame which may be implemented using a hopping beam.

Satellites produce spot beam downlinks that communicate information in time division multiplexed (TDM) frames. In general, the frames include an overhead section and a payload section. The overhead section includes, for example, a guard band and synchronization bits while the payload section carries the "billable" or "useful" data bits. Every time the TDM downlink delivers a payload section in a new frame, the overhead section is retransmitted. Thus, reducing the ratio of overhead to billable data provides an opportunity for increasing the net revenue.

In general, these beams may be hopped in time such that any particular downlink beam may illuminate different geographical spots on the ground, called cells, at any particular time. Such hopping beams permit a single beam to provide broader geographical coverage with a single satellite transmitter chain, saving spacecraft size and weight.

For hopping beams, each beam hop must start with a retransmission of the synchronization sequence. However, any transmission of overhead information necessarily reduces useful data throughput. Such repetition is particularly undesirable in satellite communications, where bandwidth is extremely valuable and useful data throughput is critical to profitability.

In addition to reducing the useful information throughput, the duration of the overhead information represents a hand limit on the minimum delay between delivery of payload sections. In other words, delivery of data that must be split across payload sections in multiple frames incurs an additional delivery delay for every frame. Thus, large messages or data transfers invariably incur significant delivery delays according to the number of frames over which the message or data is distributed.

An additional issue arises for hopping beams in which the hopping pattern is influenced by the traffic demands. Since the hopping pattern may not be fixed, the ground terminal would need some knowledge of the hopping sequence in order to known which transmissions contain payloads destined for that terminal. One such method would be for a network controller to broadcast hop sequences to all terminals, but this entails significant overhead and control. Another approach would be to require each terminal to estimate received downlink power and process those TDMA hops for which the measured power exceeds some threshold. This method has the disadvantage in that terminals at ground cell boundaries may experience very small differences in received power between hops directed to it and hops directed to the adjacent ground cells.

A need exists in the industry for a downlink frame format that addresses the problems noted above and others previously experienced.

BRIEF SUMMARY OF THE INVENTION

A preferred embodiment of the present invention provides a downlink waveform for communicating payloads of data in a time division multiplexed frame stream. The frame signal includes a first payload field and a first header field with a first frame type indicator. The frame signal also includes a second payload field and a second header field smaller than the first header field that includes a second frame type indicator. The first payload field, first header field, second payload field, and the second header field are encapsulated in a single frame to provide a multiple payload frame with reduced overhead compared to individually transmitted single payload frames.

As will be explained in detail below, the first header field may include a hopping beam guard band with a duration encompassing circuit switching delay to hop a downlink beam between geographical areas, a masterframe count, a subframe count, a pseudorandom noise synchronization code, and a payload type indicator. The first and second payloads may be scrambled according to a pseudorandom noise scrambling sequence. The frame signal may be extended to N payloads with N header fields in a single frame that incurs less overhead than N separately transmitted frames carrying a single payload.

A preferred embodiment of the present invention also provides a method for transmitting a communication frame. The method steps include transmitting a first header field including a first frame type indicator and a first payload field. The method continues by transmitting a second header field smaller than the first header field and including a second frame type indicator followed by a second payload field. As noted above, the first payload field, first header field, second payload field, and the second header field are encapsulated in a single frame.

In another preferred embodiment of the present invention, a downlink frame processing module forms the frames. The downlink frame processing module includes an outer coder, an inner coder coupled to the outer coder, and a downlink frame organizer. The downlink frame organizer packages overlead data and coded data produced by the outer coder and inner coder sequence into a single frame as described above.

DETAILED DESCRIPTION OF THE INVENTION

Figure 1:
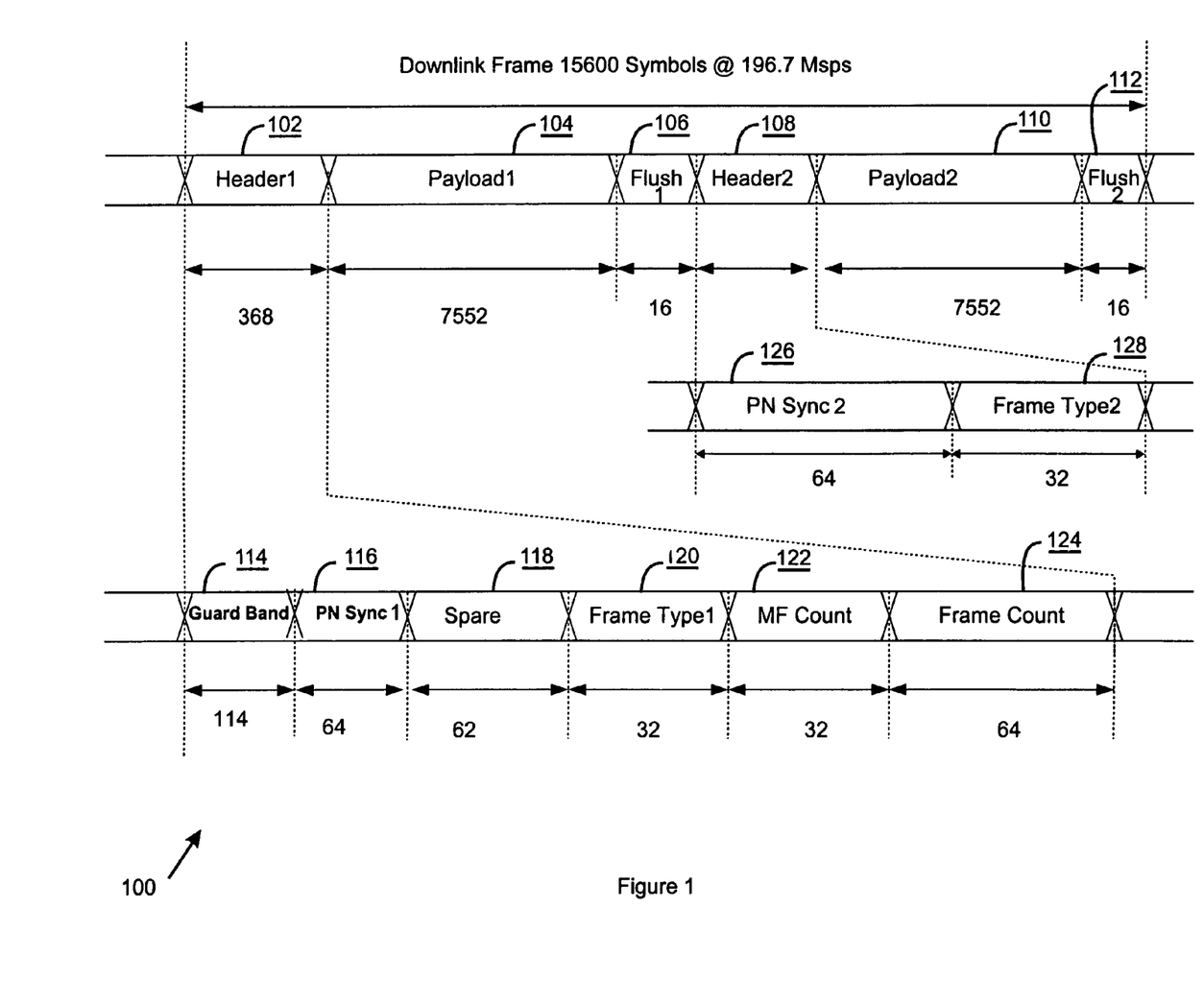
FIG. 1 illustrates an exemplary multiple payload frame signal.

Turning now to FIG. 1, that figure illustrates a multiple payload frame signal 100. The frame 100 includes a first header field 102 followed by a first payload field 104 and a first flush field 106. In addition, the frame format 100 includes a second header field 108 followed by a second payload field 110 and another flush field 112. The first header field 102, first payload field 104, first flush field 106, second header field 108, second payload field 110, and second flush field 112 are all encapsulated into the single frame 100.

Continuing with reference to FIG. 1, the first header field 102 is composed of several subfields. In particular, the first header field 102 includes a hopping beam guard band 114, a first payload pseudorandom noise (PN) synchronization field 116, and a spare field 118. The first header field 102 also includes a first frame type field 120, a masterframe count field 122, and a subframe count field 124.

The second header section includes a smaller set of subfields, namely, the second PN synchronization field 126 and the second frame type field 128.

Table 1, below, shows the preferred length and modulation of each field. Symbols are preferably transmitted at 196.7 megasymbols per second.

TABLE 1

| Field | Symbols | Modulation |
|---|---|---|
| first header 102 | 368 | |
| hopping beam guard band 114 | 114 | BPSK |
| first payload PN synch 116 | 64 | BPSK |
| spare 118 | 62 | BPSK |
| first frame type 120 | 32 | BPSK |
| masterframe count 122 | 32 | BPSK |
| subframe count 124 | 64 | BPSK |
| first payload 104 | 7552 | QPSK |
| first flush 106 | 16 | QPSK |
| second header 108 | 96 | |
| second payload PN synch 126 | 64 | BPSK |
| second frame type 128 | 32 | BPSK |
| second payload 110 | 7552 | QPSK |
| second flush 112 | 16 | QPSK |
| TOTAL LENGTH | 15600 | |

The hopping beam guard band 114 provides, in the preferred embodiment, approximately 580 ns of guard time. In general, however, the length of the hopping beam guard band 114 is selected to encompasses an expected circuit switching downlink beam hopping delay. The downlink beam hopping delay represents a worst case estimate of the amount of time that the satellite needs to redirect a downlink beam (i.e., "hop" the beam) to a different geographic area.

The first PN synchronization field 116 and the second PN synchronization field provide synchronization bits for earth terminals. As will be explained in more detail below, a single PN synchronization sequence generator is used to provide an identical PN sequence for both PN synchronization fields 116, 118. The subframe count field 124 counts individual frames as they are transmitted. Preferably, the subframe count field 124 includes a 16 bit downlink frame count appended with 8 zeros and convolutionally encoded with a relatively heavy (e.g., 3/8 rate) code. When the subframe count field 124 reaches 9328, for example, the masterframe count field 122 increments. The masterframe count rolls over after reaching its maximum value (0xFFFFFFFF), although it may be reset or preprogrammed at any time.

The space field 118 may be drawn from to provide subsequent enhancements to the frame 100 (e.g., additional synchronization bits). Preferably, the spare field 118, the hopping beam guard band 114, and first PN synchronization field 116 are filled with PN bits that are generated by a PN synchronization sequence generator discussed below.

The first frame type field 120 generally indicates characteristics of the first payload field 104, while the second frame type field 128 generally indicates characteristics of the second payload field 110. The frame type field may be coded using a rate ½ block code, such as an (8, 4) Reed-Muller code. Several examples of codes for the first and second frame type fields 120, 128 are illustrated below in Table 2.

TABLE 2

| Frame Type | Uncoded Value | Coded Value |
|---|---|---|
| Light Coding | 110 | 00111100 |
| Heavy Coding | 011 | 10010110 |
| Frame Gate | 001 | 10100101 |
| Power Gate | 000 | 11110000 |

Although the light coding, heavy coding, and power gating options are with reference to a payload itself, the frame gate option indicates power gating of an entire frame (i.e., all 15600 symbols). Each coded value is preferably repeated four times in the frame type field. For example, a frame type of 00111100 00111100 00111100 00111100 in the first frame type field 120 incidates that the first payload field 104 is lightly coded. As another example, a frame type of 11110000 1111000 11110000 11110000 in the second frame type field 128 indicates that the second payload field 110 will be power gated. When a frame or payload field is power gated, only a small fraction of the ordinary output power will be generated in the downlink beam during for the entire frame, or during the identified payload(s).

With regard to the heavy coding and light coding, as examples, a lightly coded payload may indicate ¾ rate, constraint length 7, punctured convolutional coding of 1416 Reed-Solomon block coded bytes. A heavily coded payload may indicate a ⅜ rate, constraint length 7, punctured convolutional coding of 608 Reed-Solomon block coded bytes. Thus, the first and second payload fields remain the same size (7552 symbols) under both coding rates.

The first and second payload fields 104, 110 carry the "useful" data to the earth terminals. The first and second payload fields 104, 110 are typically concatenated coded using an inner convolutional code. The first and second flush fields 106, 112 are provided as a means to flush the last of the "useful" data bits from the spacecraft convolutional encoders, providing the earth terminal convolutional decoders opportunity to successfully decode the entire burst.

The frame signal 100 delivers multiple payloads (in the preferred embodiment, two payloads) in a single frame. Although a first header field 102 is provided as well as a second header field 108, the second header field 108 is smaller than the first header field 102. In particular, the second header field does not repeat the hopping beam guard band 114 (since the receiver(s) for the first and second payload fields 104, 110 are in the same beam spot for the current hop location), space field 118, masterframe count 122 and subframe count 124 (since only one count is needed for the single multiple payload frame).

As a result, the frame 100 delivers two payloads in a single frame with less overhead than would be incurred by transmitting two single payload frames. Throughput is therefore higher. The specific frame format 100 shown in FIG. 1 may be generalized to a single N payload N header frame, under the general condition that the sum of the overhead arising from the N headers is less than the sum of the overhead arising from N individual single payload frames.

In a typical implementation, multiple frames may be grouped into a master frame. This permits allocation of system resources and scheduling of system events on a longer time scale, if desired. In the preferred embodiment, 9328 frames make up a master frame.

Figure 2:
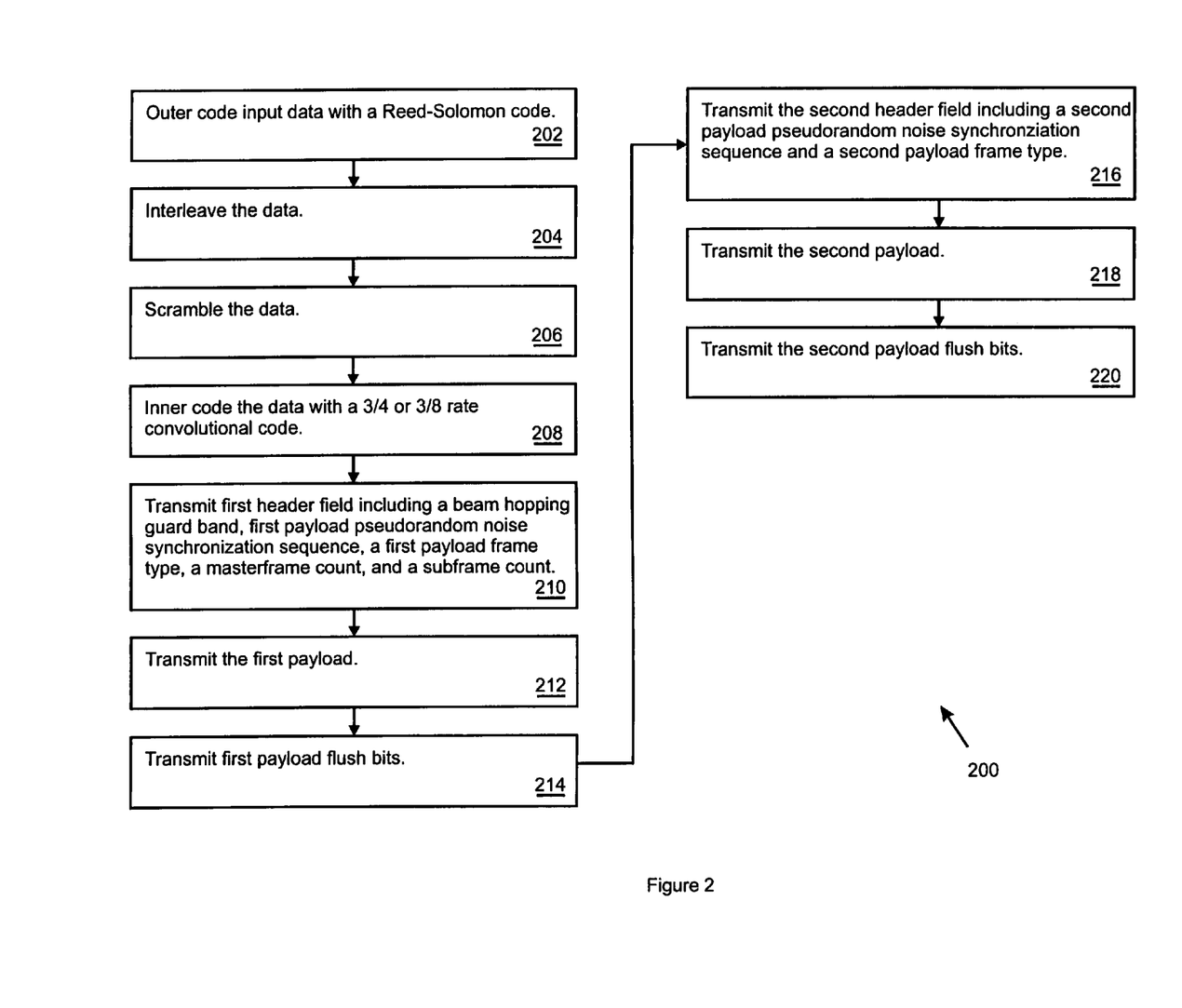
FIG. 2 depicts a method for transmitting information to form a multiple payload frame.

Turning now the FIG. 2, that figure summarizes a method 200 for transmitting a multiple payload frame. The method includes outer coding 202 payload data with a Reed-Solomon code, interleaving 204 the data, scrambling 206 the data, and inner coding 208 the data with a rate ¾ or ⅜ rate convolutional code. While the multiple payload frame 100 does not necessarily require any coding, scrambling, or interleaving, the payload data is preferably thus conditioned for reliable transmission in the frame 100.

A preferred form of the interleaving tables is presented below. Table 3 shows the manner in which the interleaving table is filled with lightly coded payload bytes, while Table 4 shows the manner in which QPSK I and Q bits are read out of that interleaving table. Similarly, Table 5 shows the manner in which the interleaving table is filled with heavily coded payload bytes, while Table 6 shows the manner in which QPSK I and Q bits are read out of that interleaving table.

TABLE 3

Byte Input (Light)

| | Col 0 | Col 1 | Col 2 | Col 3 | ... | Col 234 | Col 235 |
|---|---|---|---|---|---|---|---|
| Row 0 | 0 | 1 | 2 | 3 | ... | 234 | 235 |
| Row 1 | 236 | 237 | 238 | 239 | ... | 470 | 471 |
| Row 2 | 472 | 473 | 474 | 475 | ... | 706 | 707 |
| Row 3 | 708 | 709 | 710 | 711 | ... | 942 | 943 |
| Row 4 | 944 | 945 | 946 | 947 | ... | 1178 | 1179 |
| Row 5 | 1180 | 1181 | 1182 | 1183 | ... | 1414 | 1415 |

TABLE 4

I & Q Output (Light)

| | Col 0 | Col 1 | Col 2 | Col 3 | ... | Col 234 | Col 235 |
|---|---|---|---|---|---|---|---|
| Row 0 | I0 | Q0 | I6 | Q6 | ... | I702 | Q702 |
| Row 1 | I1 | Q1 | I7 | Q7 | ... | I703 | Q703 |
| Row 2 | I2 | Q2 | I8 | Q8 | ... | I704 | Q704 |
| Row 3 | I3 | Q3 | I9 | Q9 | ... | I705 | Q705 |
| Row 4 | I4 | Q4 | I10 | Q10 | ... | I706 | Q706 |
| Row 5 | I5 | Q5 | I11 | Q11 | ... | I707 | Q707 |

TABLE 5

Byte Input (Heavy)

| | Col 0 | Col 1 | Col 2 | Col 3 | ... | Col 234 | Col 235 |
|---|---|---|---|---|---|---|---|
| Row 0 | 0 | 1 | 2 | 3 | ... | 234 | 235 |
| Row 1 | 236 | 237 | 238 | 239 | ... | 470 | 471 |
| Row 2 | 472 | 473 | 474 | 475 | ... | 706 | 707 |

TABLE 6

I & Q Output (Heavy)

| | Col 0 | Col 1 | Col 2 | Col 3 | ... | Col 234 | Col 235 |
|---|---|---|---|---|---|---|---|
| Row 0 | I0 | Q0 | I3 | Q3 | ... | I351 | Q351 |
| Row 1 | I1 | Q1 | I4 | Q4 | ... | I352 | Q352 |
| Row 2 | I2 | Q2 | I5 | Q5 | ... | I353 | Q353 |

Continuing with reference to FIG. 2, the method 200 transmits 210 the first header field 202, transmits 212 the first payload field 104, and transmits 214 the first flush bits. Subsequently, the method 200 transmits 216 the second header field 108, transmits 218 the second payload field 110, and transmits 220 the second payload flush field 112. As noted above, each of the fields are encapsulated into a single downlink frame. Thus, after the second payload flush field 112 is transmitted, the second prepares and sends the next multiple payload frame, starting at step 202.

Figure 3:
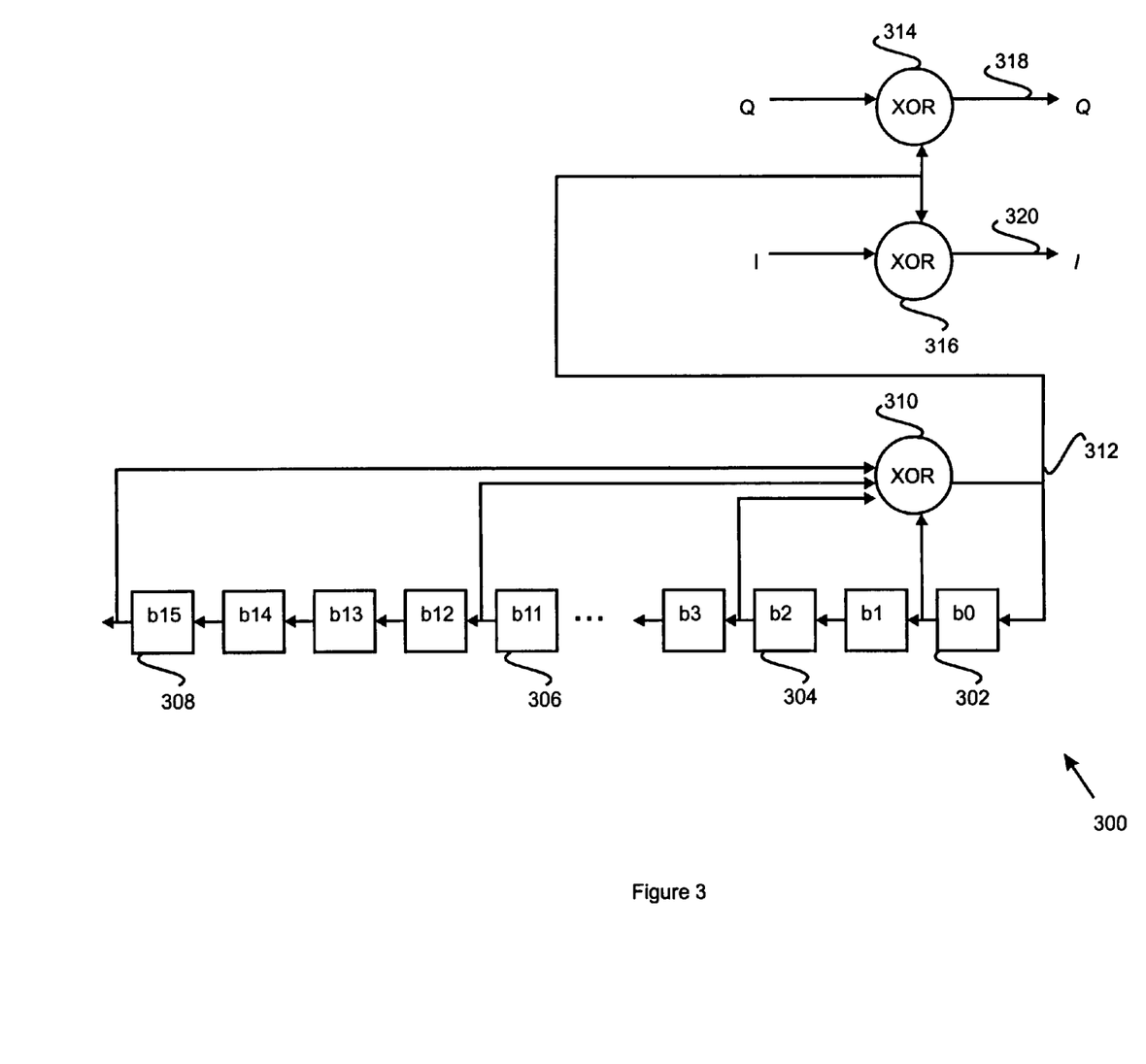
FIG. 3 shows a pseudorandom noise scrambling sequence generator.

Turning now to FIG. 3, that figure illustrates a preferred embodiment of a PN scrambling sequence generator 300. The generator 300 includes a serially connected set of shift registers (e.g., the shift registers 302, 304, 306, and 308). The output of registers 302–308 are input to an XOR gate 310 which produces PN bits on the pseudorandom noise scrambling sequence output 312. The sequence output 312 connects to the Q bit XOR gate 314 as well as the I bit XOR gate 316. Thus, payload data pulled out of the interleaving tables as I and Q bits presented in scrambled form on the scrambled Q output 318 and the scrambled I output 320.

The PN bits on the scrambling sequence output 312, as illustrated in FIG. 3, correspond to the generator polynomial $x^{16}+x^{15}+x^{13}+x^4+1$. Other generator polynomials may be used, however. In general, the scrambling sequence generator 300 is preloaded at the beginning of each frame 100 to an initial state. The initial state may vary from frame to frame, for example, based on the current downlink beam hop location. In addition, the sequential state may be varied from masterframe to masterframe in a sequence defined by an algorithm controlled by a key. Varying the initial state provides a means to limit system access only to authorized user terminals, i.e., those terminals with the current keys. Note also that when no scrambling is desired, the scrambling sequence generator 300 may be preloaded with zeros.

Figure 4:
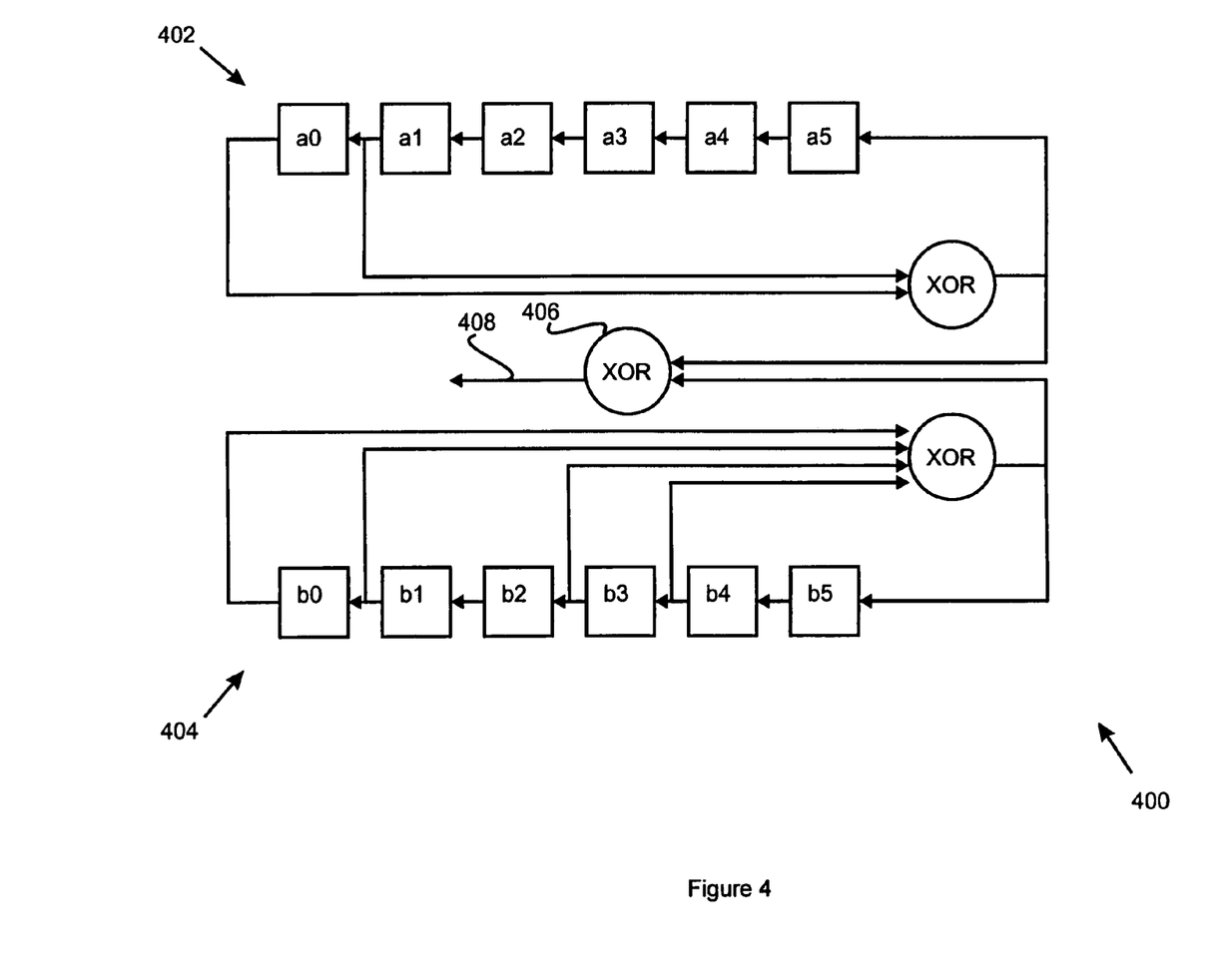
FIG. 4 shows a pseudorandom noise synchronization sequence generator.

As noted above, the first and second payload PN synchronization fields 116, 126 provide the ground terminal with a synchronization reference. FIG. 4 shows a Gold Code PN synchronization sequence generator 400 that may be used to generate the PN synchronization bits. The sequence generator 400 includes a first PN code generator 402 and a second PN code generator 404. The first PN code generator 402 implements the polynomial $1+X+X^6$, while the second PN code generator 404 implements the polynomial $1+X+X^3+X^4+X^6$. The outputs of the first and second PN code generators 402, 404 are coupled to the XOR gate 406 which produces PN bits on the PN synchronization sequence output 408.

As with the scrambling sequence generator 300, the PN synchronization sequence generator 400 may be preloaded at the beginning of each frame 100 to an initial state. The initial state may vary from frame to frame, for example, based on the current downlink beam hop location. Additionally, the first PN code generator 402 may be seeded independently of the second PN code generator 404. Either or both the first and second PIN code generators 402, 404 may be used to provide a particular PN bit output when the downlink beam hops to a first location, and a second PN bit output when the downlink hops to a second location. In the preferred approach, the spacecraft would be programmed to provide orthogonal sequences in frames destined to different hops. The embodiment of the sequence generators 402 and 404 provides for a multitude of possible sequences. Such an approach permits the earth terminals to correlate on the synchronization pattern and to compare the correlated value against a threshold to determine whether a downlink hop is intended for that earth terminal. Using orthogonal synchronization sequences maximizes the difference between correlation results between even and odd downlink hops, and resolves the aforementioned ambiguity which results from a terminal being situated on hop boundaries. Using orthogonal synchronization sequences permits the network to adaptively alter the hopping pattern to reflect traffic demands without complex coordination. An adaptive hopping pattern permits a higher downlink efficiency.

Preferably, the sequence generator 400 runs during, and provides PN bits for, the guard band 114, first payload PN synchronization field 116, and the space field 118. The sequence generator 400 is then halted until PN bits are needed for the second payload synchronization field 126, at which time the sequence generator 400 continues. Once the sequence generator 400 generates the PN bits for the second payload synchronization field 126, the sequence generator 400 is halted until the next frame. The PN bits for the guard band 114 and the space field 118 ensure that the power spectral density after modulation and transmission, is within acceptable limits.

Note that as illustrated, the period of the sequence generator 400 is 63. Note also that 126 BPSK symbols or 126 bits separate the first payload PN synchronization field 116 and the second payload PN synchronization field 126 (from the point of view of the sequence generator 400). Thus, the sequence generator 400 provides PN bits in the second payload PN synchronization field 126 that are identical to the PN bits provided for the first payload PN synchronization field 116 because it continues to run over the spare field 118.

A single PN sequence generator 400 thereby provides the ground terminals with multiple opportunities to acquire synchronization from a single frame. Only a single seed need be provided on the satellite and on the ground (although additional seeds may be used if desired). An additional benefit is that the earth terminals can distinguish one frame from the next, as the boundaries of each frame will encompass two identical PN synchronization fields. Furthermore, although the downlink beam may hop between two geographic locations (and thereby be absent from a cell for an entire frame time), twice as many synchronization fields are provided. In other words, the average time between synchronization opportunities is the same as with a single header and payload non-hopping downlink beam.

Figure 5:
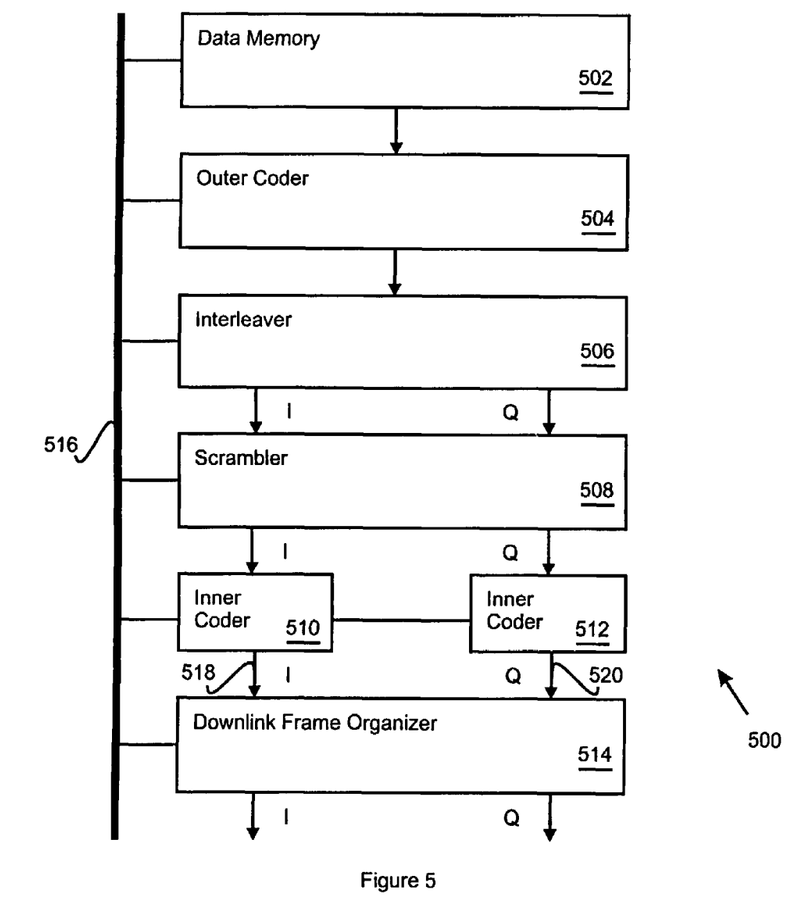
FIG. 5 illustrates a downlink frame processing module.

Turning next to FIG. 5, that figure illustrates a downlink frame processing module 500 that produces the frame 100. The processing module 500 includes a data memory 502, an outer coder 504, and an interleaver 506. The processing module 500 also includes a scrambler 508, an I convolutional encoder 510 and corresponding Q convolutional encoder 512, and a downlink frame organizer 514. A data and control bus 516 provides signals that control the operation of the processing module 500, including, for example, selection of convolutional encoder rates and provision of frame overhead information (e.g., frame type) for the downlink frame organizer 514.

The data memory 502 preferably stores 53 byte ATM cells. However, any particular data former may be used to supply the outer coder 504 (e.g., a Reed-Solomon encoder) with data. The interleaver 506, which accepts outer coded data, operates as shown above in Tables 3–6 to interleave the data bits and reduce the detrimental effects of burst errors that may occur after transmission.

After the processing module 500 reads I and Q data bits out of the interleaver 506, the I and Q data bits are scrambled in the scrambler 508. The scrambler 508 may be implemented as illustrated in FIG. 5 and described above. The processing module 500 then convolutionally encodes the scrambled I and Q data bits and presents the coded data to the downlink frame organizer 514 on the coded data outputs 518, 520.

The downlink frame organizer 514 packages the coded data into the frame 100 according to the format shown in FIG. 1. In addition, the downlink frame organizer 502 may also maintain internally, or receive over the control and data bus 516, the masterframe count and subframe count. Similarly, the downlink frame organizer 514 may accept the coded first and second frame types for packaging into the frame 100. The downlink frame organizer 514, as it builds the frame 100, passes frame bits to an RF modulator, e.g., a QPSK or staggered QPSK modulator (not shown), that creates the frame waveform for amplification and transmission.

Figure 6:
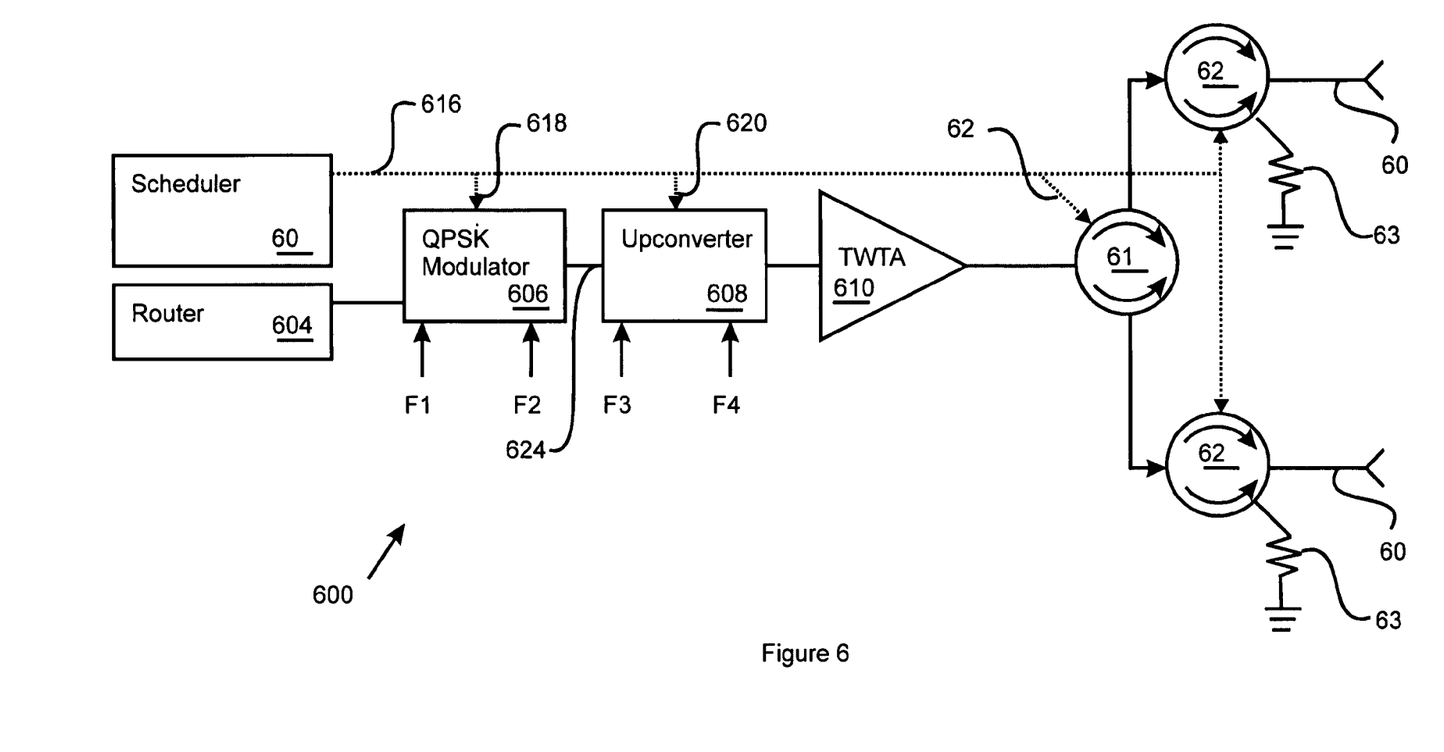
FIG. 6 shows an implementation of a downlink hopping waveform transmission system.

With regard to FIG. 6, a more specific implementation of a downlink hopping waveform transmission system 600 is shown. The transmission system 600 includes a data scheduler 602, a data router 604, and a waveform processing chain including a QPSK modulator 606, an upconverter 608, and a traveling wave tube amplifier (TWTA) 610. A ferrite switch 612 directs the waveform to be transmitted through either the first feed path 601 or the second feed path 603.

FIG. 6 also shows a control output 616 (that may be used to carry, as examples a power gating signal and a beam hopping selection signal), two frequency selection inputs 618 and 620 for the modulator 606, a feed path selection input 622, and an intermediate waveform output 624 from the modulator. Preferably, additional ferrite switches 626 and 628 in the feed paths 601, 603 provide additional signal isolation (e.g., approximately 20 dB between input and output when the ferrite switch is off). In other words, the additional ferrite switches 601, 603 operate in response to the control output 616 to pass or block a waveform to be transmitted through the feed paths 601, 603. For example, if the RF waveform is destined for the feed path 601, then the ferrite switch 628 is switched to the ground load 632. If the RF waveform is destined for the feed path 603, then the ferrite switch 626 is switched to the ground load 630.

During operation, the transmission system 600 accepts baseband data from the router 604 (e.g., an ATM cell router), and creates a waveform to be transmitted using the waveform processing chain. The waveform processing starts by directly converting baseband I and Q data to an intermediate frequency of, for example, 750 MHz. The waveform processing then selects one of F1 (e.g., 3.175 MHz) and F2 (e.g., 3.425) and one of F3 (e.g., 16 GHz) and F4 (e.g., 17.4 GHz) to produce a waveform to be transmitted with a final center frequency at one of 18.425 GHz, 18.675 GHz, 19.825 GHz, and 20.075 GHz. The scheduler 602 monitors the propagation of data through the waveform processing chain and determines when certain frame signals should be power gated. To that end, the scheduler 602 provides a power gating signal on the control output 616 that is active when power gating is to occur.

The TWTA 610 amplifies the waveform to be transmitted, while the switch 612 determines along which feed path 601–603 (or additional feed paths) the amplified waveform will propagate. For this reason, the switch 612 includes the feed path selection input 622 responsive to information on the control output 616. Because the feed paths 601–603 are generally (though not necessarily) associated with the feed horns that produce spot beams in geographically distinct terrestrial cells, the feed path selection input 622 acts to determine the hop location of the downlink waveform. Thus, the downlink manifests itself as a beam spot that, typically, provides bandwidth for multiple terrestrial cells by hopping between them.

Figure 7:
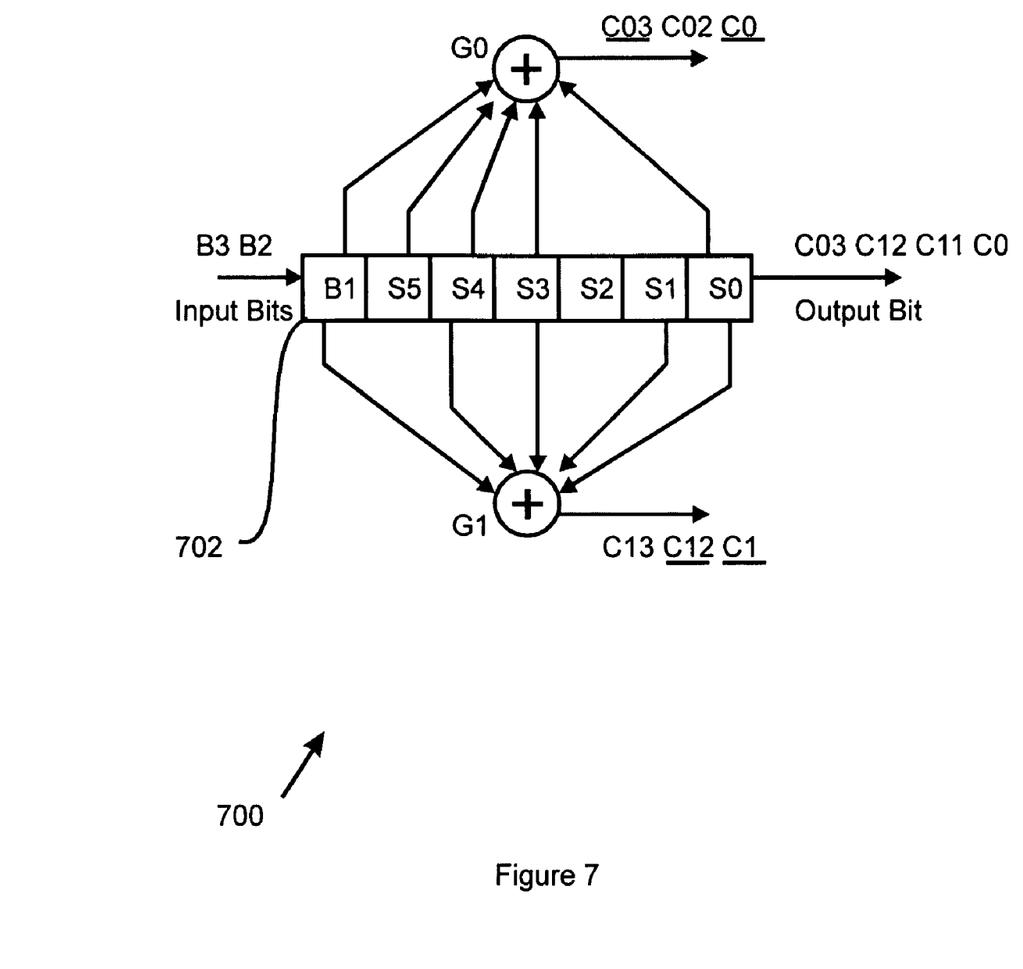
FIG. 7 illustrates an implementation of a light convolutional encoder.

Turning next to FIG. 7, that figure illustrates a light coding convolutional encoder 700. The convolutional encoder 700 provides a ¾ rate, constraint length 7 convolutional code with a puncturing pattern of |g0|g1|g1g0| read right to left, where "|" delimits bit input epochs. The modulo two adders G0 and G1, and shift register 702 implement:

C01=B1+S5+S4+S3+S0
C11=B1+S4+S3+S1+S0
C12=B2+S5+S4+S2+S1
C03=B3+B2+B1+S5+S2

With generators G0=[1111001] and G1=[1011011].

Figure 8:
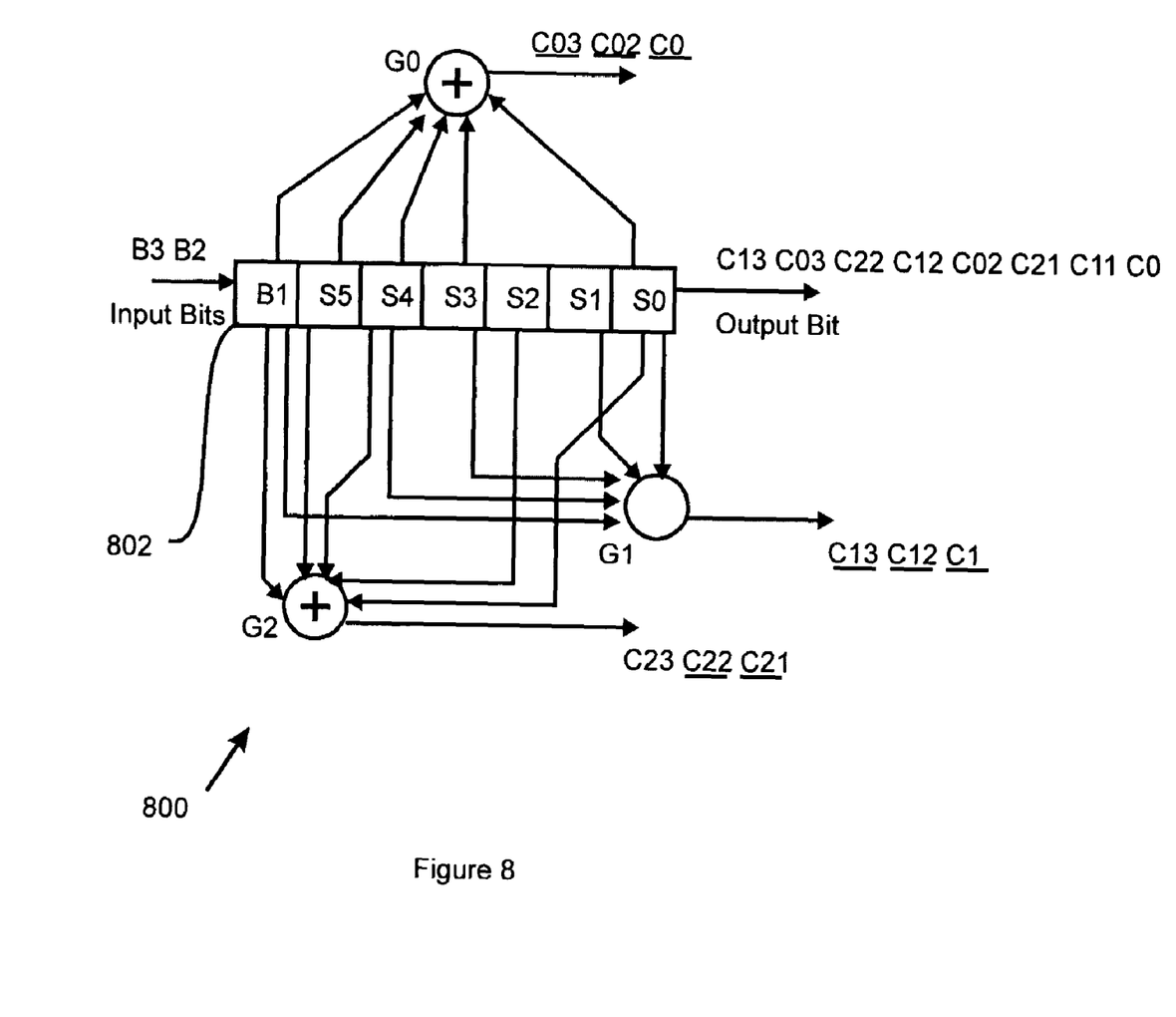
FIG. 8 shows an implementation of a heavy convolutional encoder.

With regard to FIG. 8, that figure illustrates a heavy coding convolutional encoder 800. The convolutional encoder 800 provides a ⅜ rate, constraint length 7 convolutional code with a puncturing pattern of |g1g0|g2g0|g2g1g0| read right to left, where "|" delimits bit input epochs. The modulo two adders G0, G1, G2, and shift register 802 implement:

C01=B1+S5+S4+S3+S0
C11=B1+S4+S3+S1+S0
C21=B1+S5+S4+S2+S0
C02=B2+B1+S5+S4+S1
C22=B2+B1+S5+S3+S1
C03=B3+B2+B1+S5+S2
C13=B3+B1=S5+S3+S2

With generators G0=[1111001]G1=[1011011], G2=[1110101].

While the invention has been described with reference to preferred embodiments, those skilled in the art will understand that various changes may be made and equivalents may be substituted without departing from the scope of the invention. In addition, many modifications may be made to adapt a particular step, structure, or material to the teachings of the invention without departing from its scope. Therefore, it is intended that the invention not be limited to the particular embodiment disclosed, but that the invention will include all embodiments falling within the scope of the appended claims.

What is claimed is:

1. A method for transmitting a communication frame, the method comprising:
    transmitting a first header field including a first frame type field;
    transmitting a first payload field;
    transmitting a second header field smaller than the first header field and including a second frame type field; and
    transmitting a second payload field;
    the first payload field, first header field, second payload field, and the second header field being encapsulated in a single frame;
    wherein transmitting the first header field comprises transmitting a first pseudorandom noise synchronization field, wherein transmitting the second header field comprises transmitting a second pseudorandom noise synchronization field, and wherein the first and second pseudorandom noise synchronization fields carry identical pseudorandom noise synchronization codes.

2. The method of claim 1, wherein transmitting the first header field further comprises transmitting a hopping beam guard band having a duration encompassing an expected circuit switch downlink beam hopping delay.

3. The method of claim 1, wherein transmitting the first header field further comprises transmitting at least one of a first payload coding identifier and a first payload power gating identifier in the first payload field type indicator, and wherein transmitting the second header field further comprises transmitting at least one of a second payload coding identifier and a second payload power gating identifier in the second payload field type indicator.

4. The method of claim 3, wherein transmitting the first payload coding identifier comprises transmitting one of a heavy or light coding identifier, and wherein transmitting the second payload coding identifier comprises transmitting one of a heavy or light coding identifier.

5. A method for transmitting a communication frame, the method comprising:
    transmitting a first header field including a first frame type field;
    transmitting a first payload field;
    transmitting a second header field smaller than the first header field and including a second frame type field; and
    transmitting a second payload field;
    the first payload field, first header field, second payload field, and the second header field being encapsulated in a single frame;
    wherein transmitting the first header field further comprises transmitting at least one of a first payload coding identifier and a first payload power gating identifier in the first payload field type indicator, and wherein transmitting the second header field further comprises transmitting at least one of a second payload coding identifier and a second payload power gating identifier in the second payload field type indicator;
    wherein transmitting the first payload coding identifier comprises transmitting one of a heavy or light coding identifier, and wherein transmitting the second payload coding identifier comprises transmitting one of a heavy or light coding identifier;
    wherein transmitting the first payload power gating identifier comprises transmitting one of a first payload power gate identifier and a frame power gate identifier, and wherein transmitting the second payload power gating identifier comprises transmitting one or a second payload power gate identifier and the frame power gate identifier.

6. A downlink frame processing module comprising:
    an outer coder;
    an inner coder coupled to the outer coder, the inner coded data output; and
    a downlink frame organizer connected to the coded data output, wherein the downlink frame organizer packages coded data present on the coded data output into a single frame including:
    a first payload field;
    a first header field including a first frame type field;
    a second payload field; and
    a second header field smaller than the first header field and including a
    second frame type field;

wherein the first header field and the second header field include an identical pseudorandom noise synchronization code.

7. The downlink frame processing module of claim 6, further comprising a scrambler coupled to the inner coder and the outer coder.

8. The downlink frame processing module of claim 6, wherein the outer coder is a Reed-Solomon encoder and the inner coder is a Convolutional encoder.

9. The downlink frame processing module of claim 6, wherein the first header field further includes a hopping beam guard band having a duration encompassing an expected circuit switching beam hopping delay.

10. The downlink frame processing module of claim 6, wherein the first payload field type indicator includes at least one of a coding identifier and a power gating identifier.

11. The downlink frame processing module of claim 10, further comprising a data memory coupled to the outer coder.

12. The downlink frame processing module of claim 11, wherein the data memory stores 53-byte ATM cells.

\* \* \* \* \*